United States Patent [19]

Ando et al.

[11] Patent Number: 5,221,785
[45] Date of Patent: Jun. 22, 1993

[54] POLYMER COMPOSITE AND RUBBER CONTACTS

[75] Inventors: Takao Ando; Hiroshi Itayama, both of Kyoto; Katsura Gohda, Osaka, all of Japan

[73] Assignee: Sanyo Chemical Industries, Ltd., Kyoto, Japan

[21] Appl. No.: 957,036

[22] Filed: Oct. 6, 1992

[30] Foreign Application Priority Data

Nov. 1, 1991 [JP] Japan .................................. 3-315430
Jun. 22, 1992 [JP] Japan .................................. 4-216277

[51] Int. Cl.$^5$ ............................................ C08L 75/04
[52] U.S. Cl. .................................. 525/123; 525/127; 525/130; 525/131
[58] Field of Search ................. 525/123, 127, 130, 131

[56] References Cited

U.S. PATENT DOCUMENTS 3,969,475 7/1976 Horiuchi et al. ...................... 528/76
4,665,128 5/1987 Cluff et al. ........................... 525/123

FOREIGN PATENT DOCUMENTS 95345 7/1975 Japan .
207757 9/1991 Japan .
2246356 1/1992 United Kingdom .

Primary Examiner—Maurice J. Welsh
Attorney, Agent, or Firm—Wegner, Cantor, Mueller & Player

[57] ABSTRACT

A polymer composite comprises about 5 to 95 parts by weight of a copolymer (A) selected from the group consisting of olefin/diene copolymer and ethylene/(meth)acrylic acid ester copolymer, and 5 to 95 parts by weight of a polyurethane resin (B), wherein the polyurethane resin is one which is synthesized in the melted copolymer in the absence of a compatibilizer, a composition for molding comprising such polymer composite and electroconductive fillers and its molded article, and rubber contacts. The polymer composite possesses the flexibility and durability equivalent to those of silicone rubber, has excellent injection molding property, can be made by a short manufacturing process, and can be manufactured inexpensively. The polymer composite of the invention, when used together with an electroconductive filler, is effectively applied as rubber contacts, that is, flexible electric connection members of electric products.

11 Claims, No Drawings

POLYMER COMPOSITE AND RUBBER CONTACTS

BACKGROUND OF THE INVENTION

1. Field of the Invention

This invention relates to a polymer composite and formed articles thereof. More particularly, the invention relates to a polymer composite which is inexpensive, can be obtained from a short process, and is excellent in flexibility, durability, and injection molding properties. More precisely, the invention relates to an elastomer material useful for rubber contacts.

2. Description of the Prior Art

As elastomers for rubber contacts excellent in flexibility and durability, hitherto, silicone rubber has been known. Resins designed to have same performance as the silicone rubber have been proposed. For example, a composite of polyester and nylon was disclosed in the Japanese Patent Application Laid-Open No. 55054/1985, a composite of thermoplastic polyurethane and nitrile rubber etc. in the Japanese Patent Application Laid-Open No. 207757/1991, a composite of polyolefin and polyurethane in the U.S. Pat. No. 3,969,475, and a composite of thermoplastic resin such as polypropylene and polyurethane in the Japanese Patent Application Laid-Open No. 227459/1990.

However, the silicone rubber, although excellent in flexibility and durability, involves many problems in economy, working efficiency and productivity, such as higher price as compared with general-purpose elastomers, shorter pot life, and long curing time. On the other hand, the polyester composite, nylon composite, and nitrile rubber composite mentioned above are less expensive than the silicone rubber, but possess such demerits as low flexibility and durability, and long processes required for manufacture of the composites. Yet, since one resin component is not sufficiently dispersed in the other resin component, they have problem such as low durability.

The composites disclosed in the U.S. Pat. No. 3,969,475 and the Japanese Patent Application Laid-Open No. 227459/1990 are sufficient in flexibility, but are inferior in repeated bending strength due to insufficient dispersion.

Thus, these composites do not satisfy the requirements for economy, flexibility and durability, especially as the polymer materials for rubber contacts.

SUMMARY OF THE INVENTION

It is an object of the invention to provide a polymer composite which possesses flexibility and durability equivalent to those of silicone rubber, excels in injection molding properties, and can be manufactured at low cost.

It is another object of the invention to provide a polymer composite which has a short manufacturing process, is easy to manufacture, and is excellent in productivity.

It is still another object of the invention to provide a polymer composite useful as rubber contacts or the like for electric products such as elastic connectors or the like.

It is a further object of the invention to provide a composition for molding which comprises a polymer composite and an electroconductive filler, and molded articles made therefrom.

A still further object of the invention is to provide rubber contacts used as electric connection members for electric products.

Namely, the present invention provides a polymer composite which comrises about 5 to 95 parts by weight of a copolymer (A) selected from the group consisting of olefin/diene copolymer and ethylene/(meth)acrylic acid ester copolymer, and 5 to 95 parts by weight of a polyurethane resin (B), wherein the polyurethane resin is one which is synthesized in the melted copolymer in the absence of a compatibilizer, and molded articles manufactured from such a composite.

The invention also relates to a composition for molding comprising the polymer composite and an electroconductive filler.

The invention further relates to molded articles from a composition for molding comprising the polymer composite and an electroconductive filler.

The invention still further relates to rubber contacts comprising the polymer composite and an electroconductive filler.

DETAILED DESCRIPTION OF THE INVENTION

As the olefin component in the olefin-diene copolymer in the present invention, olefins having two to five carbon atoms, such as ethylene, propylene, 1-butene, 2-butene, and isobutylene etc. are used. The preferred one is isobutylene.

As the diene monomer component in the olefin-diene copolymer, dienes such as butadiene, isoprene, 2,3-butadiene, cyclopentadiene and chloroprene etc. are used. The preferred one is isoprene.

The ratio of the olefin and the diene component in the olefin/diene copolymer is usually 99.5:0.5 to 50:50 by mole ratio, and preferably 99:1 to 90:10.

As the (meth)acrylate component in the ethylene/(meth)acrylate copolymer, methyl-, ethyl-, butyl- or hexyl-esters of acrylic acid or methacrylic acid may be used. Methyl- or ethyl-esters of acrylic acid or methacrylic acid are preferable. Here, "(meth)acryl - - - " means "acryl - - - " and/or "methacryl - - - ", and this is the same hereinafter.

The ratio of the ethylene component and the (meth)acrylate component in the ethylene/(meth)acrylate copolymer is generally 10:90 to 90:10 by mole ratio, and preferably 10:90 to 50:50.

The weight-average molecular weight of the olefin/diene copolymer or the ethylene/(meth)acrylate copolymer (A) in the present invention is usually 10,000 to 3,000,000, or preferably 10,000 to 1,000,000.

In the above mentioned copolymers (A), the olefin/diene copolymer is preferable, and an isobutylene/isoprene copolymer is particularly preferable.

As the polyisocyanate component (B1) used in synthesis of polyurethane resin (B) in the present invention, materials such as aromatic diisocyanate (tolylene diisocyanate, xylylene diisocyanate, naphthylene diisocyanate, diphenylmethane diisocyanate, etc.); aliphatic diisocyanate (hexamethylene diisocyanate, 2,2,4-trimethylhexane diisocyanate, lysine diisocyanate, etc.); alicyclic diisocyanate (1,4-cyclohexane diisocyanate, isophorone diisocyanate, 4,4'-dicyclohexylmethane diisocyanate, methylcyclohexane diisocyanate, isopropylidene dicyclohexyl-4,4'-diisocyanate, 1,3-diisocyanatomethyl cyclohexane, etc.); aliphatic diisocyanate having an aromatic ring (xylylene diisocyanate, tetramethyl xylylene diisocyanate, etc.); and their modified diisocyanates (diisocyanates having carbodiimide group, uretidione group, urethimine group, biuret group, and/or isocyanurate ring etc.), and mixture of two or more thereof are mentioned as examples. Aromatic diisocyanates are particularly preferable.

As high molecular weight polyol components (B2) used in the synthesis of polyurethane resin (B) in the present invention, there can be used polyester polyols [as obtained by condensation polymerization of aliphatic dicarboxylic acid (succinic acid, adipic acid, sebacic acid, glutaric acid, azelaic acid, etc.) and/or aromatic dicarboxylic acid (isophthalic acid, terephthalic acid, etc.) with low molecular weight glycols (ethylene glycol, propylene glycol, 1,4-butanediol, 1,6-hexane diol, 3-methyl-1,5-pentane diol, neopentyl glycol, 1,4-dihydroxymethyl cyclohexane, etc.)], such as polyethylene adipate diol, polybutylene adipate diol, polyhexamethylene adipate diol, polyneopentyl adipate diol, polyethylene/butylene adipate diol, poly-3-methylpentane adipate diol, polybutylene isophthalate diol; polyether polyols [as obtained by polymerization or copolymerization of an alkylene oxide (ethylene oxide, propylene oxide, butylene oxide, etc.) and/or heterocyclic ether (tetrahydrofurane, etc.)], such as polyethylene glycol, polypropylene glycol, polyethylene-polypropylene glycol (block or random copolymer), polyethylene-polytetramethylene glycol (block or random copolymer), polytetramethylene ether glycol, polyhexamethylene ether glycol, etc.; polylactone polyols (e.g. polycaprolactone diol or triol, poly-3-methylvalerolactone diol); polycarbonate polyols (e.g. polyhexamethylene carbonate diol); polyolefin polyols (e.g. polybutadiene glycol, polyisopreneglycol, or those hydrogenated products); and mixtures of two types or more thereof.

A favorable polyol component among them is polyester diol obtained by condensation of aliphatic dicarboxylic acid and low molecular weight glycol.

In the manufacture of the polyurethane resin (B), a chain extender (B3) may be used as required. As the chain extender (B3), low molecular weight polyol and polyamine may be used. Examples of low molecular weight polyols include glycol listed as the material for the polyester polyol above and their low molecular weight alkylene oxide adducts (molecular weight less than 500); low molecular weight alkylene oxide adducts to bisphenol (molecular weight less than 500); trivalent alcohol, such as glycerin, trimethylol ethane, trimethylol propane, and their low molecular weight alkylene oxide adducts (molecular weight less than 500); and mixtures of two types or more thereof. Examples of polyamine include aliphatic polyamine, such as ethylene diamine, N-hydroxyethyl ethylene diamine, tetramethylene diamine, hexamethylene diamine, diethylene triamine, etc.; alicyclic polyamine, such as 4,4'-diaminodicyclohexyl methane, 1,4-diaminocyclohexane, isophorone diamine, etc.; aliphatic polyamine having an aromatic ring, such as xylylene diamine, tetramethyl xylylene diamine, etc.; aromatic polyamine, such as 4,4'-diaminodiphenyl methane, tolylene diamine, benzidine, phenylene diamine, etc.; and mixtures of two or more thereof. When the chain extender (B3) is used, the content is generally 0.3 to 30 wt. % of the high molecular polyol, preferably 0.5 to 20 wt. %.

In the manufacture of polyurethane resin (B), a catalyst may be also used as required. As the catalyst, any known catalyst for the urethane forming reaction may be used, for example, organic metal compounds such as dibutyl tin dilaurate and dioctyl tin laurate, and amines such as triethylamine, triethylene triamine and diazabicycloundecene etc.

The ratio by weight of copolymer (A) and polyurethane resin (B) in the polymer composite of the present invention is generally 5:95 to 95:5, preferably 5:95 to 50:50. More preferably, the ratio is 10:90 to 40:60. If the content of the copolymer (A) is less than 5, the hardness is too high, and the obtained composite lacks in flexibility, or if the content of the copolymer (A) exceeds 95, the impact resilience is poor, and when the obtained composite is used in rubber contacts, the touch is inferior, and the injection molding properties are lowered.

The polymer composite of the invention is obtained by reaction of (B1) and (B2), and also with (B3) if necessary, in the presence of the melted copolymer (A). The reaction is carried out without a compatibilizer.

In the case of reaction of (B1) and (B2), and with (B3) if necessary, in the presence of the melted copolymer (A), the temperature is usually 10° to 350° C., or preferably 100° to 300° C. The reaction pressure is not particularly limited, but considering the industrial production, it is usually 0 to 20 atmospheres, or preferably 0 to 10 atmospheres (at gauge pressure). The reaction time should be as short as possible, in order that thermal deterioration of the resulted polyurethane resin may not occur during reaction, and is usually 0.5 to 60 minutes, preferably 1 to 30 minutes.

As the reaction vessel for manufacturing the polymer composite of the invention, any known mixer is usable, for example, extruder, kneader, Banbury mixer, and planetary mixer.

The molding method for the polymer composite of the invention is not particularly defined, and any known method may be applied. For example, the injection molding method, extrusion molding method, and compression molding method may be employed. From the viewpoint of working efficiency and productivity, the injection molding method is preferred.

The composite of the invention may contain, if necessary, electroconductive fillers, mold release agents, coloring agents, foaming agents, weather resistant stabilizers, lubricants, plasticizers, coupling agents, heat resistant stabilizers, flame retardants, and the like.

As the electroconductive fillers, fine powders of copper oxide and carbon black etc. are used.

As the mold release agents, silicone oil, ester of stearic acid or its metal salt, wax, and other higher aliphatic hydrocarbon etc. are used.

As the coloring agents, inorganic pigments such as carbon black, titanium oxide and calcium carbonate, and organic pigments such as phthalocyanin and Quinacridone Red are exemplified.

As the foaming agents, azo compound such as azobisisobutylonitrile, nitroso compounds such as dinitrosopentamethylene tetramine, and sulfonyl hydrazide compounds such as p-toluene sulfonyl hydrazide are exemplified.

As the weather resistant stabilizers, salicylates such as phenyl salicylate, benzophenone derivatives such as 2,4-dihydroxybenzophenone, benzotriazole derivatives such as 2-(2'-hydroxy-5'-methylphenyl)benzotriazole, and cyanoacrylate esters such as 2-ethylhexyl-2-cyano-3,3'-diphenylacrylate are exemplified.

As the lubricants, higher fatty acids are exemplified, such as liquid paraffin and stearic acid.

As the plasticizers, phosphate esters such as tributyl phosphate, phthalate esters such as dimethyl phthalate, and higher fatty acid esters such as butyl oleate are exemplified.

As the coupling agents, silane type coupling agents such as γ-methacryloxy propyl trimethoxy silane, and titanate type coupling agents such as isopropyl triisostearoyl titanate are exemplified.

As the heat resistant stabilizers, phenol derivatives such as butyl hydroxy annisol, sulfur containing compounds such as dilauryl thiodipropionate, and phosphate esters such as triphenyl phosphite are exemplified.

As the flame retardants, halogen compounds such as 2,2-bis(4-hydroxy-3,5-dibromophenyl)propane, and phosphorus compounds such as ammonium phosphate are exemplified.

Rubber contacts are, meanwhile, tactile switches for sending electric signals used in electric and electronic products such as electronic desktop calculator, electronic keyboard, and personal computer. In other words, they are rubber pushbutton switch elements, and are usually divided into the inner type and key top type by the contact structure. Both feature tactile feedback characteristics with a crisp sharp-click operation. Such switches must be electroconductive, and the single-key construction in which the button itself is electroconductive, and the double construction consisting of an insulation layer and electroconductive layer are both employed generally.

The composite of the invention, when applied in rubber contacts, is desired to possess the mechanical properties of hardness of 50 to 75 (conforming to JIS A of JIS K 6301), impact resilience of 50 to 75%, tensile strength of 80 to 150 kg/cm$^2$, and 100% stress of 20 to 50 kg/cm$^2$. If the impact resilience is less than 50% and the hardness exceeds 75, the touch as rubber switches is inferior, or if the hardness is less than 50 and the impact resilience is over 75%, injection molding properties are lowered.

The composite having such mechanical properties is obtained, for example, by melting and kneading 40 parts by weight of isobutylene/isoprene rubber, 46 parts by weight of hydroxy-terminated polyethylene adipate, 2 parts by weight of 1,4-butanediol, and 12 parts by weight of diphenyl methane diisocyante, in a twin-shaft extruder, at a cylinder temperature of 210° C. It is also obtained by melting and kneading 10 parts by weight of isobutylene/isoprene rubber, 73 parts by weight of hydroxy-terminated polyethylene adipate, 3 parts by weight of 1,4-butanediol, and 14 parts by weight of diphenyl methane diisocyanate, in a twin-shaft extruder, at a cylinder temperature of 210° C.

The polymer composite of the invention possesses the flexibility and durability equivalent to those of silicone rubber, and is excellent in injection molding properties and inexpensive. Besides, the polymer composite of the invention can be manufactured in a short manufacturing process because it can be obtained by a one-shot polymerization technique. Furthermore, the polymer composite of the invention has excellent repeated bending strength because both polymers are uniformly dispersed microscopically.

The composite of the invention is particularly suitable to rubber contacts for electronic calculators, electronic keyboards, computers and word processors. It is also usable as rubber contacts for electric household appliances and sheets for keyboard cover.

The invention is further described below by referring to examples, but it must be noted that the invention is not limited to these examples alone. In the following description, the parts denote the parts by weight.

The measuring methods of hardness, impact resilience, tensile strength, 100% stress and dispersibility of examples and comparative examples listed in Table 1 are as follows.

(1) Hardness
    Conforming to JIS K 6301 (JIS A and D).
(2) Impact resilience
    Conforming to JIS K 6301.
    Unit: %
(3) Tensile strength and 100% stress
    Conforming to JIS K 6301.
    Unit: kg/cm$^2$
(4) Dispersibility
    Evaluated from SEM (scanning electron microscope) photograph of test piece.

EXAMPLE 1

40 parts of isobutylene-isoprene rubber [the containing ratio of isobutylene and isoprene is 98:2 (mole ratio), weight-average molecular weight 100,000, "JSR Butyl 365" manufactured by Japan Synthetic Rubber Co., Ltd., hereinafter abbreviated IIR], 46 parts of hydroxy-terminated polyethylene adipate [number-average molecular weight 2,000, hereinafter abbreviated PEA], 2 parts of 1,4-butanediol [hereinafter abbreviated 1,4-BG], and 12 parts of diphenyl methane diisocyanate [hereinafter abbreviated MDI] were melted and kneaded for five minutes in a twinshaft extruder [model 2D25-S of Toyo Seiki Seisakusho, 20 mm φ, L/D=25] at 210° C. (cylinder temperature), and the composite of the invention was obtained.

The obtained composite was injection molded at a cylinder temperature of 200° C. and metal mold temperature of 50° C., and a test piece was prepared. In this test piece, the hardness, impact resilience, tensile strength, and 100% stress were evaluated. The characteristics are shown in Table 1.

EXAMPLE 2

10 parts of IIR, 73 parts of PEA, 3 parts of 1,4-BG, and 14 parts of MDI were melted and kneaded for five minutes in the twin-shaft extruder of Example 1 at a cylinder temperature of 210° C., and the composite of the invention was obtained.

The obtained composite was injection molded at a cylinder temperature of 200° C. and metal mold temperature of 50° C., and a test piece (No. 3, JIS K 6301) was prepared. In this test piece, the hardness, impact resilience, tensile strength, 100% stress, and dispersibility were evaluated. The characteristics are shown in Table 1.

EXAMPLE 3

40 parts of IIR, 46 parts of PEA, 2 parts of 1,4-BG, 12 parts of MDI, and 5 parts of carbon black were melted and kneaded for five minutes in the twin-shaft extruder of Example 1 at a cylinder temperature of 210° C., and the composite of the invention was obtained.

The obtained composite was injection molded at a cylinder temperature of 200° C. and die temperature of 50° C., and a test piece (No. 3, JIS K 6301) was prepared. In this test piece, the hardness, impact resilience, tensile strength, and 100% stress were evaluated. The characteristics evaluation results are shown in Table 1.

EXAMPLE 4

40 parts of ethylene/methylacrylate copolymer ("YUKALON-EMA XG-200M" manufactured by Mitsubishi Petrochemical Company, Ltd.), 46 parts of PEA, 2 parts of 1,4-BG, and 12 parts of MDI were melted and kneaded for five minutes, by using the twin-shaft extruder, at a cylinder temperature of 210° C. Its characteristics evaluation results are shown in Table 1.

EXAMPLE 5

By injection molding of the composite obtained in Example 1 at a cylinder temperature of 200° C. and metal mold temperature of 50° C., rubber contacts were obtained. In the obtained rubber contacts, the click rate was 50%, and the click rate after repeated use of 100,000 times was 48%.

COMPARATIVE EXAMPLE 1

A commercially available silicone rubber for rubber switch (SE4706V manufactured by Toray Dow Corning Silicone Company) was compression molded at 200° C., and a test piece was prepared. As in Example 1, the hardness, impact resilience, tensile strength and 100% stress of the test piece were evaluated. The results are shown in Table 1.

COMPARATIVE EXAMPLE 2

A commercially available polyester elastomer/nylon elastomer composite for rubber switch ("GRILUX E-200" manufactured by Dainnipon Ink and Chemicals, Inc.) was injection molded at a cylinder temperature of 220° C. and metal mold temperature of 50° C., and a test piece was prepared. As in Example 1, the hardness, impact resilience, tensile strength and 100% stress of the test piece were evaluated. The results are shown in Table 1.

COMPARATIVE EXAMPLE 3

A commercially available thermoplastic polyurethane/nitrile rubber composite for rubber switch ("DYNAFLEX LU9008" manufactured by Japan Synthetic Rubber Co., Ltd.) was compression molded at 180° C. and a test piece was prepared. As in Example 1, the hardness, impact resilience, tensile strength and 100% stress of the test piece were evaluated. The results are shown in Table 1.

COMPARATIVE EXAMPLE 4

77 parts of PEA, 3 parts of 1,4-BG, and 20 parts of MDI were kneaded and polymerized for five minutes, by using the twin-shaft extruder, at a cylinder temperature of 210° C.

The obtained polyurethane polymer was injection molded at a cylinder temperature of 200° C. and metal mold temperature of 50° C., and a test piece was prepared. As in Example 1, the hardness, impact resilience, tensile strength and 100% stress of the test piece were evaluated. Its characteristics are shown in Table 1.

COMPARATIVE EXAMPLE 5

The IIR used in Example 1 was compression molded at 140° C., and a test piece was prepared. As in Example 1, the hardness, impact resilience, tensile strength and 100% stress of the test piece were evaluated. Its characteristics are shown in Table 1.

COMPARATIVE EXAMPLE 6

40 parts of polypropylene ("UBE POLYPRO J6709H" manufactured by Ube Industries, Ltd.), 46 parts of PEA, 2 parts of 1,4-BG, and 12 parts of MDI were kneaded for five minutes, by using the twin-shaft extruder, at a cylinder temperature of 180° C.

The obtained composite was injection molded at a cylinder temperature of 200° C. and die temperature of 50° C., and a test piece was prepared. As in Example 1, the hardness, impact resilience, tensile strength, 100% stress, and dispersibility of the test piece were evaluated. Its characteristics evaluation results are shown in Table 1.

COMPARATIVE EXAMPLE 7

40 parts of polyethylene ("ESPRENE E808" manufactured by Sumitomo Chemical Company, Limited), 46 parts of PEA, 2 parts of 1,4-BG, and 12 parts of MDI were kneaded for five minutes, by using the twin-shaft extruder, at a cylinder temperature of 180° C.

The obtained composite was injection molded at a cylinder temperature of 200° C. and die temperature of 50° C., and a test piece was prepared. As in Example 1, the hardness, impact resilience, tensile strength, 100% stress, and dispersibility of the test piece were evaluated. Its evaluation results are shown in Table 1.

COMPARATIVE EXAMPLE 8

40 parts of ethylene/propylene copolymer ("UBE POLYETHY F522" manufactured by Ube Industries, Ltd.), 46 parts of PEA, 2 parts of 1.4-BG, and 12 parts of MDI were kneaded for five minutes, by using the twin-shaft extruder, at a cylinder temperature of 180° C.

The obtained composite was injection molded at a cylinder temperature of 200° C. and metal mold temperature of 50° C., and a test piece was prepared. As in Example 1, the hardness, impact resilience, tensile strength, 100% stress, and dispersibility of the test piece were evaluated. Its characteristics are shown in Table 1.

TABLE 1

|  | EXAMPLE | | | | COMPARATIVE EXAMPLE | |
|---|---|---|---|---|---|---|
|  | 1 | 2 | 3 | 4 | 1 | 2 |
| Mechanical properties | | | | | | |
| Hardness | 58 | 70 | 60 | 73 | 60 | 84 |
| Impact resilience (%) | 60 | 68 | 62 | 68 | 62 | 74 |
| Tensile strength (Kg/cm$^2$) | 90 | 140 | 100 | 140 | 90 | 150 |
| 100% tensile stress (Kg/cm$^2$) | 25 | 40 | 27 | 35 | 25 | 50 |
| Injection molding property | GOOD | GOOD | GOOD | GOOD | POOR | GOOD |
| Dispersibility (microns) | 0.1 | 0.1 | 0.1 | 0.1 | 10 | 10 |

|  | COMPARATIVE EXAMPLE | | | | | |
|---|---|---|---|---|---|---|
|  | 3 | 4 | 5 | 6 | 7 | 8 |

TABLE 1-continued

| Mechanical properties | | | | | | |
|---|---|---|---|---|---|---|
| Hardness | 82 | 80 | 22 | 23* | 82 | 98 |
| Impact resilience (%) | 72 | 68 | 8 | 65 | 72 | 62 |
| Tensile strength (Kg/cm$^2$) | 280 | 430 | 30 | 350 | 150 | 230 |
| 100% tensile stress (Kg/cm$^2$) | 52 | 40 | 9 | 120 | 48 | 80 |
| Injection molding property | POOR | GOOD | POOR | GOOD | GOOD | GOOD |
| Dispersibility (microns) | 10 | 10 | 10 | 10 | 10 | 10 |

*Value by JIS D

We claim:

1. A polymer composite comprising about 5 to 95 parts by weight of a copolymer (A) selected from the group consisting of olefin/diene copolymer and ethylene/(meth)acrylic acid ester copolymer, and 5 to 95 parts by weight of a polyurethane resin (B), wherein the polyurethane resin is one which is synthesized in the melted copolymer (A) in the absence of a compatibilizer.

2. A polymer composite according to claim 1, wherein the copolymer (A) is an isobutylene/isoprene copolymer.

3. A polymer composite according to claim 1, wherein the weight-average molecular weight of the copolymer (A) is 10,000 to 3,000,000.

4. A polymer composite according to claim 1, wherein the polyurethane resin (B) is thermoplastic.

5. A polymer composite according to claim 1, wherein the polyurethane resin (B) is a polyurethane resin obtained from aromatic diisocyanate and polyester diol.

6. A polymer composite according to claim 1, wherein the polyurethane resin (B) is a polyurethane resin obtained from aromatic diisocyanate, polyester diol, and chain extender.

7. A polymer composite according to claim 1, wherein the ratio by weight of the copolymer (A) and the polyurethane resin (B) is 5:95 to 50:50.

8. A polymer composite according to claim 1, wherein the impact resilience is 50 to 75%, and the hardness is 50 to 75.

9. A composition for molding comprising the polymer composite according to claim 1 and an electroconductive filler.

10. A molded article obtained from the composition according to claim 9.

11. A molded article according to claim 10, wherein the molded article is a rubber contact.

* * * * *